United States Patent
Strong

(10) Patent No.: US 9,163,678 B2
(45) Date of Patent: Oct. 20, 2015

(54) WEDGE CLUTCH WITH A SPLIT HUB

(71) Applicant: Schaeffler Technologies GmbH & Co. KG, Herzogenaurach (DE)

(72) Inventor: Scott Strong, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/263,219

(22) Filed: Apr. 28, 2014

(65) Prior Publication Data

US 2014/0332335 A1    Nov. 13, 2014

Related U.S. Application Data

(60) Provisional application No. 61/821,327, filed on May 9, 2013.

(51) Int. Cl.
*F16D 41/06* (2006.01)
*F16D 13/16* (2006.01)
*F16D 23/12* (2006.01)

(52) U.S. Cl.
CPC ............... *F16D 41/06* (2013.01); *F16D 13/16* (2013.01); *F16D 2023/123* (2013.01)

(58) Field of Classification Search
CPC ... F16D 41/06; F16D 41/063; F16D 41/0606; F16D 41/061; F16D 41/08; F16D 41/10
See application file for complete search history.

(56) References Cited

U.S. PATENT DOCUMENTS

| | | | |
|---|---|---|---|
| 3,967,507 A | | 7/1976 | Emms |
| 5,297,450 A | * | 3/1994 | MacPherson .................. 74/333 |
| 5,307,911 A | * | 5/1994 | Robinson ........................ 192/31 |
| 2009/0159390 A1 | | 6/2009 | Davis |
| 2010/0320054 A1 | * | 12/2010 | D'Eredita .................. 192/41 R |
| 2013/0248317 A1 | | 9/2013 | Lee |
| 2014/0014455 A1 | * | 1/2014 | Davis ......................... 192/45.1 |
| 2014/0110207 A1 | * | 4/2014 | Davis ......................... 192/45.1 |

FOREIGN PATENT DOCUMENTS

| | | |
|---|---|---|
| JP | 2009192061 | 8/2009 |
| WO | 2012025876 | 3/2012 |

* cited by examiner

*Primary Examiner* — Rodney H Bonck
*Assistant Examiner* — Lillian Nguyen
(74) *Attorney, Agent, or Firm* — Simpson & Simpson, PLLC

(57) ABSTRACT

A bi-directional wedge clutch, including: an outer race; first and second inner hubs; a wedge plate, radially located between the outer race and the inner hubs; and an axially displaceable activation hub engaged with the inner hubs and arranged to: for a free-wheel mode, rotate at least one of the inner hubs in a first rotational direction, with respect to the other of the inner hubs, such that the wedge plate is free of contact with the outer race; and for a locking mode, rotate the at least one of the inner hubs in a second rotational direction, opposite the first rotational direction, with respect to the other of the inner hubs, to non-rotatably connect the wedge plate with the outer race and the inner hubs.

20 Claims, 8 Drawing Sheets

WEDGE CLUTCH WITH A SPLIT HUB

CROSS-REFERENCE TO RELATED APPLICATIONS

This application claims the benefit under 35 U.S.C. §119 (e) of U.S. Provisional Patent Application No. 61/821,327, filed May 9, 2013, which application is incorporated herein by reference in its entirety.

TECHNICAL FIELD

The present disclosure relates to a bi-directional or one-way wedge clutch that enables switching between engaged and disengaged modes. In particular, the clutch has two inner hubs, rotatable with respect to each other, to enable switching between locking and free-wheel modes.

BACKGROUND

To provide a consistent transition from a free-wheel mode to a locking mode in a bi-directional clutch, it is known to maintain some frictional contact between components of the clutch, such as the inner or outer race, and a rotationally displaceable locking element, in order to displace the locking element to initiate a locking mode. The frictional contact results in torque drag between the inner and outer races and subsequent energy dissipation and decrease in efficiency during operation in free-wheel mode.

SUMMARY

According to aspects illustrated herein, there is provided a bi-directional wedge clutch, including: an outer race; first and second inner hubs; a wedge plate, radially located between the outer race and the first and second inner hubs; and an axially displaceable activation hub engaged with the first and second inner hubs and arranged to: for a free-wheel mode, rotate at least one of the first or second inner hubs in a first rotational direction, with respect to the other of the first or second inner hubs, such that the wedge plate is free of contact with the outer race; and for a locking mode, rotate the at least one of the first or second inner hubs in a second rotational direction, opposite the first rotational direction, with respect to the other of the first or second inner hubs, to non-rotatably connect the wedge plate with the outer race and the first and second inner hubs.

According to aspects illustrated herein, there is provided a bi-directional wedge clutch, including: an outer race; first and second inner hubs; a wedge plate, radially located between the outer race and the first and second inner hubs; and an activation hub. The first inner hub includes a first plurality of slots or a first plurality of protrusions. The second inner hub includes a second plurality of slots or a second plurality of protrusions. The activation hub includes third and fourth pluralities of slots, third and fourth pluralities of protrusions, or a third plurality of slots and a third plurality of protrusions. Respective slots or protrusions for the first and second inner hubs are engaged with respective slots or protrusions for the activation hub. The activation hub is arranged to: for a free-wheel mode, rotate at least one of the first or second inner hubs in a first rotational direction, with respect to the other of the first or second inner hubs, such that the outer race is rotatable with respect to the first and second inner hubs in the first rotational direction and in a second rotational direction, opposite the first rotational direction; and for a locking mode, rotate the at least one of the first or second inner hubs in the second rotational direction, with respect to the other of the first or second inner hubs, to non-rotatably connect the wedge plate with the outer race and the first and second inner hubs for rotation of the outer race, with respect to the first and second inner hubs, in the first and second rotational directions.

According to aspects illustrated herein, there is provided a bi-directional wedge clutch, including: an outer race; a first inner hub including a first plurality of radially extending ramps; a second inner hub including a second plurality of radially extending ramps; a wedge plate, radially located between the outer race and the first and second inner hubs; and an activation hub including first and second pluralities of protrusions. One of the first or second inner hubs includes a first plurality of slots circumferentially bending in a first or second axial direction and engaged with the first plurality of protrusions. The other of the first or second inner hubs includes a second plurality of axially aligned slots engaged with the second plurality of protrusions. The activation hub is arranged to: for a free-wheel mode, rotate the one of the first or second inner hubs in a first rotational direction, with respect to the other of the first or second inner hubs, such that the wedge plate is free of contact with the outer race; and for a locking mode, rotate the one of the first or second inner hubs in a second rotational direction, opposite the first rotational direction, with respect to the other of the first or second inner hubs, to non-rotatably connect the wedge plate with the outer race and the first and second inner hubs.

According to aspects illustrated herein, there is provided a one-way wedge clutch, including: an outer race; a first inner hub including a plurality of radially outwardly extending ramps; a second inner hub including a plurality of radially outwardly extending protrusions; a wedge plate, radially located between the outer race and the first and second inner hubs and including a plurality of radially inwardly extending ramps; and an axially displaceable activation hub engaged with the first and second inner hubs and arranged to rotate the first inner hub in a first rotational direction with respect to the second inner hub such that: for rotation of the first and second inner hubs with respect to the outer race in the first rotational direction, the pluralities of radially inwardly and outwardly extending ramps engage and displace the wedge plate radially outward to non-rotationally connect the outer race and the first and second inner hubs; and for rotation of the first and second inner hubs with respect to the outer race in a second rotational direction, opposite the first rotational direction, the plurality of radially outwardly extending protrusions engage and rotate the wedge plate such that the outer race is rotatable with respect to the first and second inner hubs.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1A:
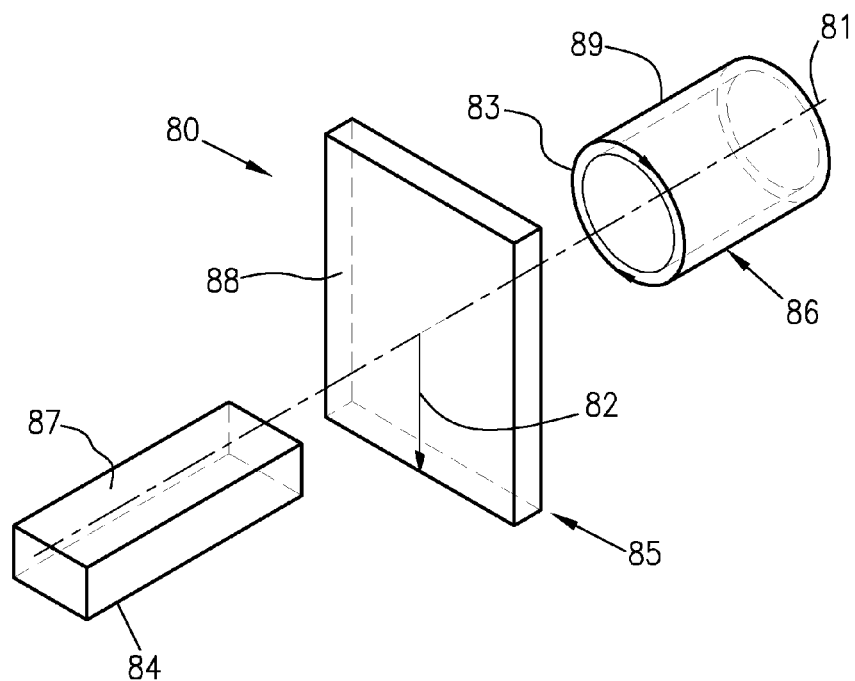
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
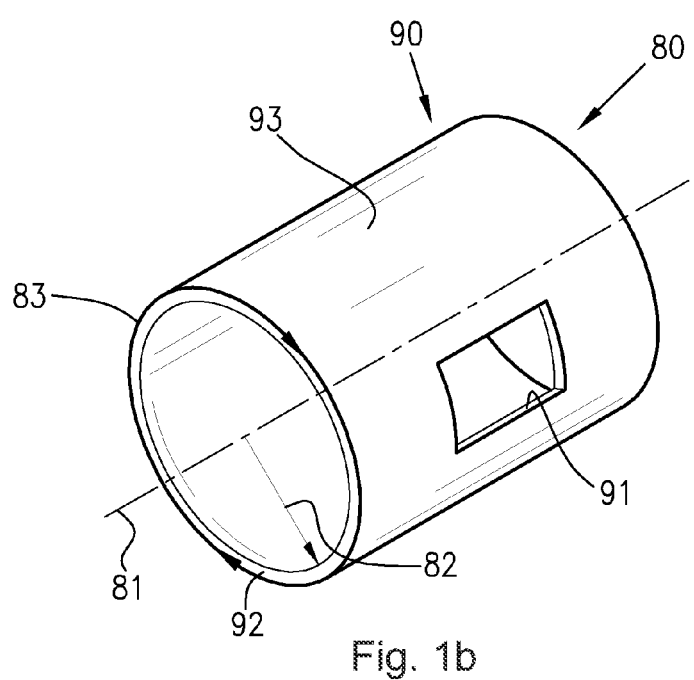
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

Figure 2:
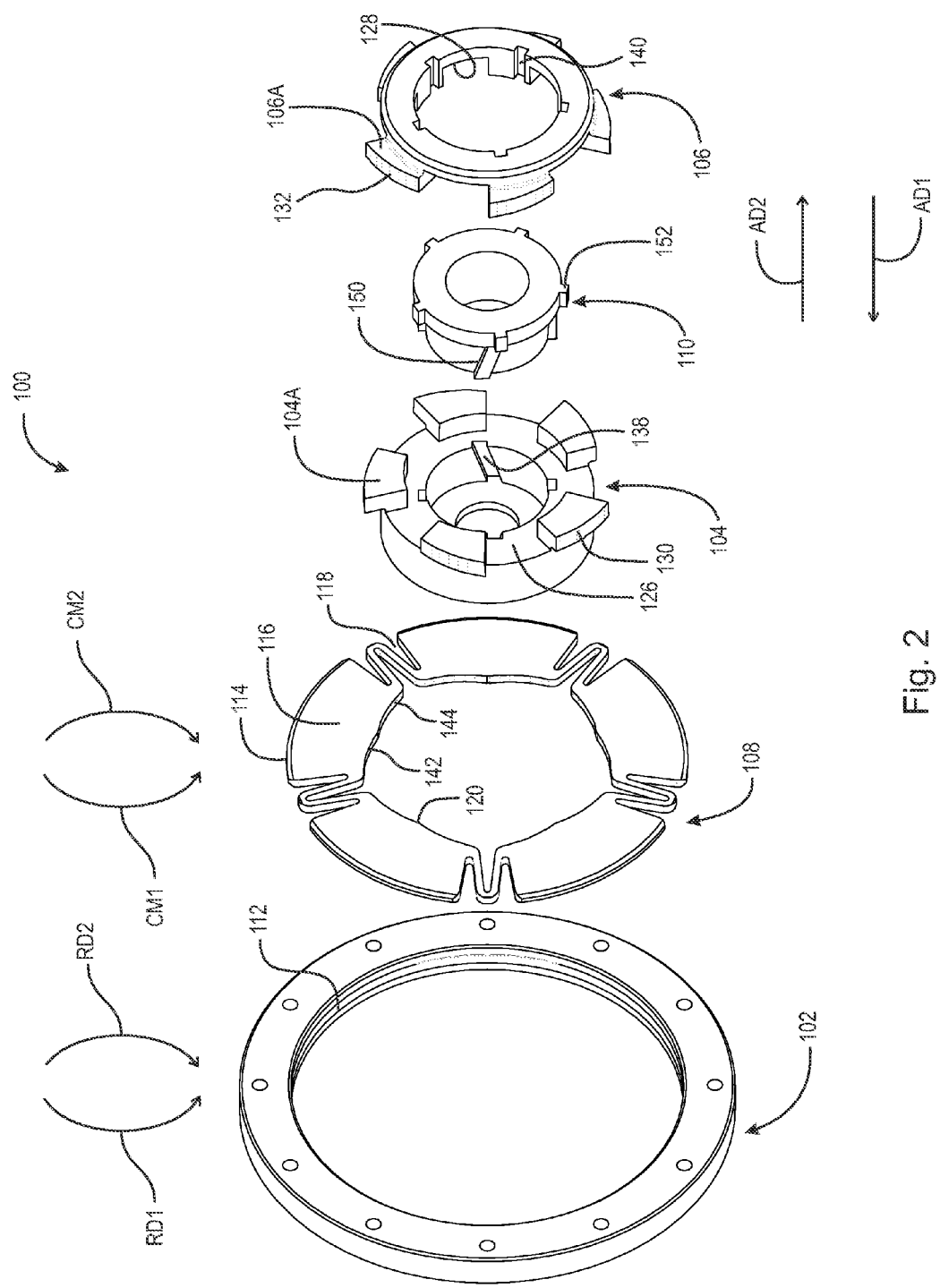
FIG. 2 is an exploded perspective view of a bi-directional clutch with split inner hubs.

FIG. 2 is an exploded perspective view of bi-directional wedge clutch 100 with a split inner hub.

Figure 3:
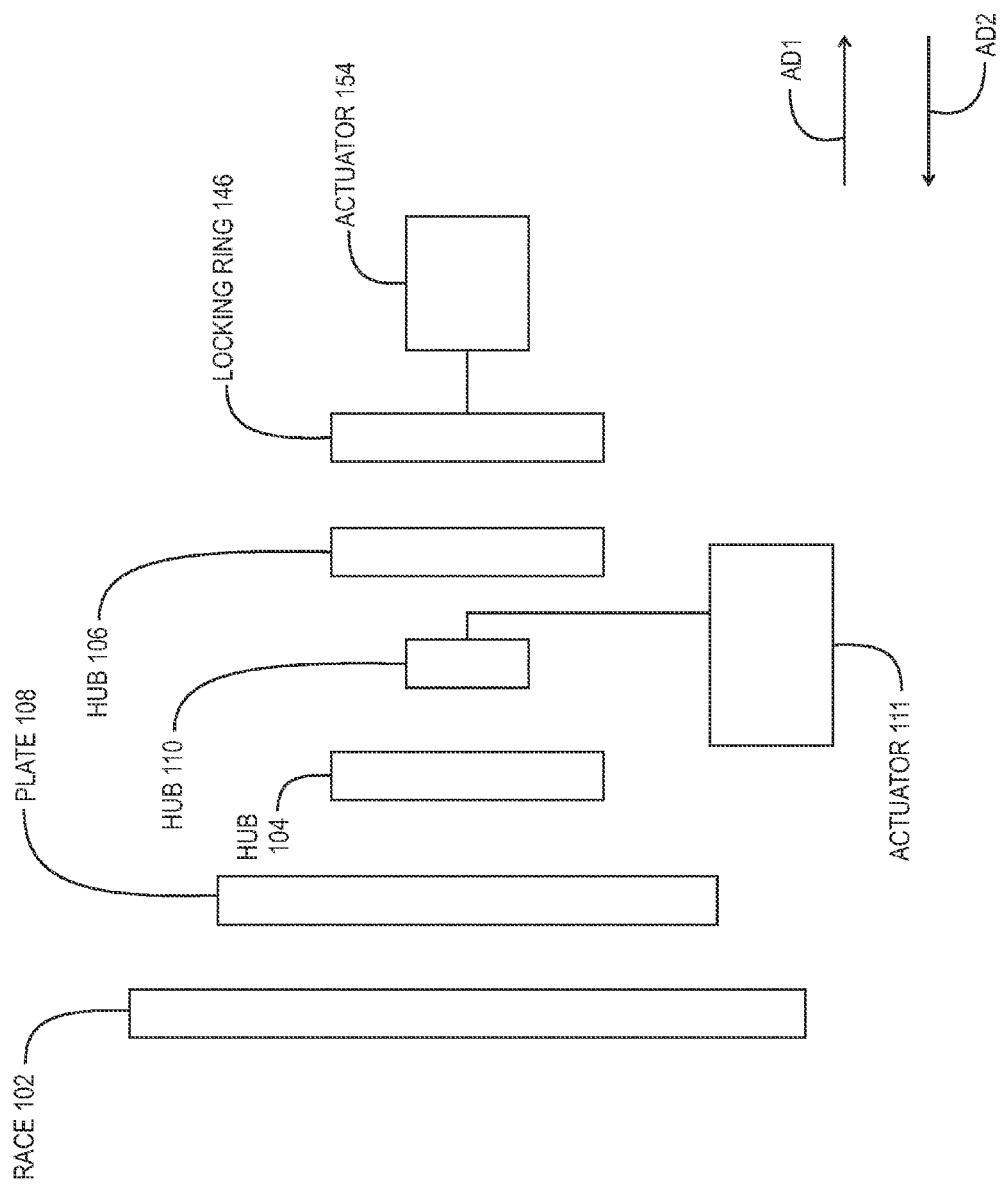
FIG. 3 is a schematic block diagram of a bi-directional clutch with split inner hubs.

FIG. 3 is a schematic block diagram of a bi-directional clutch 100 with split inner hubs.

Figure 4:
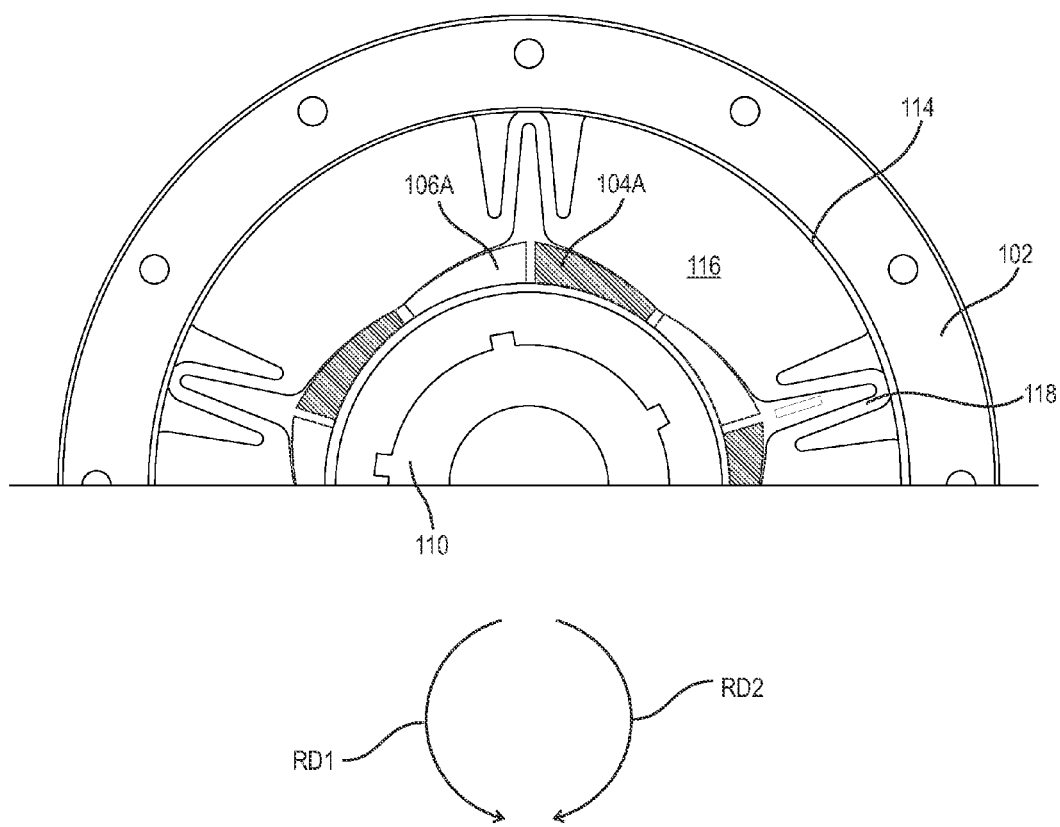
FIG. 4 is a partial front view of the bi-directional clutch of FIG. 2 with a split inner hub in a free-wheel mode.

FIG. 4 is a partial front view of bi-directional wedge clutch 100 with a split inner hub in free-wheel mode.

Figure 5:
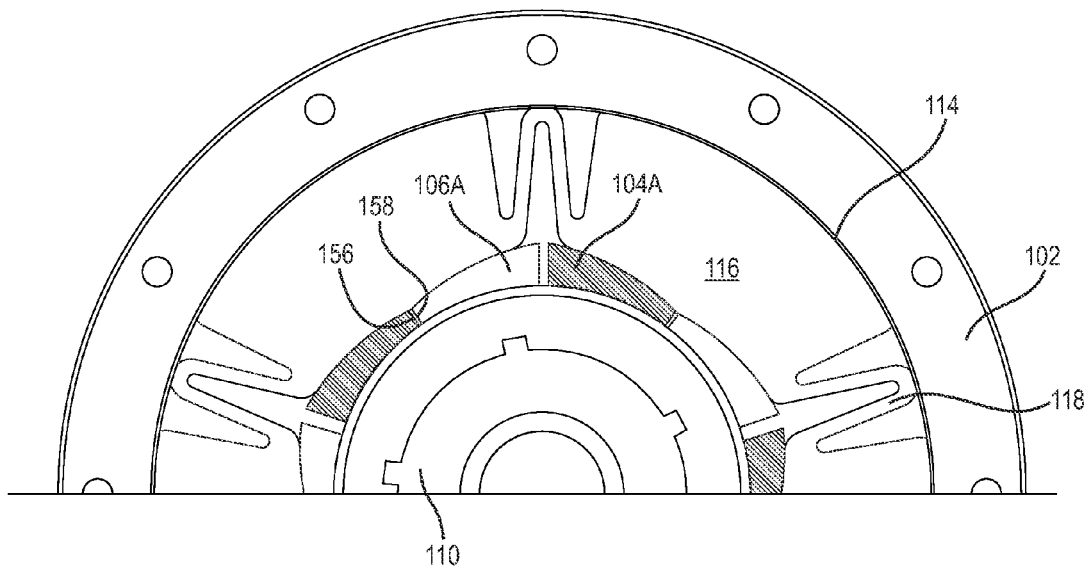
FIG. 5 is a partial front view of the bi-directional clutch of FIG. 2 with a split inner hub in a locking mode.

FIG. 5 is a partial front view of clutch 100 in a locking mode. The following should be viewed in light of FIGS. 2 through 5. Bi-directional clutch 100 includes outer race 102, inner hubs 104 and 106, and wedge plate 108, radially located between the outer race and inner hubs 104 and 106. Clutch 100 includes axially displaceable activation hub 110, engaged with inner hubs 104 and 106 and arranged to rotate at least one of inner hubs 104 and 106 with respect to the other of inner hubs 104 and 106 to transition between free-wheel and locking modes. For example, hub 110 is axially displaceable to rotate inner hub 104 in direction RD1 with respect to inner hub 106 for the free-wheel mode (outer race 102 independently rotatable with respect to inner hubs 104 and 106) and hub 110 is axially displaceable to rotate inner hub 104 in direction RD2 with respect to inner hub 106 for the locking mode (non-rotatably connecting outer race 102 to inner hubs 104 and 106). In the locking mode, outer race 102 is non-rotatably connected to inner hubs 104 and 106 for relative rotation between outer race 102 and inner hubs 104 and 106 in both of directions RD1 and RD2.

In an example embodiment, axially displaceable activation hub 110 is engaged with inner hubs 104 and 106 and is arranged to rotate inner hubs 104 and 106 in opposite rotational directions RD1 and RD2, respectively, for the free-wheel mode; and to rotate inner hubs 104 and 106 in directions RD2 and RD1, respectively, for the locking mode. Unless stated otherwise, the following discussion is directed to an embodiment in which only inner hub 104 is rotated by hub 110; however, it should be understood that the discussion is applicable to embodiments in which only inner hub 106 is rotated by hub 110 or in which hubs 104 and 106 are each rotated by hub 110.

In an example embodiment, clutch 100 includes actuator 111 for axially displacing activation hub 110. Any actuator known in the art can be used for actuator 111, including, but not limited to, a screw, electric actuator, pneumatic actuator, or hydraulic actuator.

For clutch 100, outer race 102 can be connected to an input source while inner hub 104 is an output, or outer race 102 can be an output when hub 104 is connected to an input source. The preceding configurations enable torque transmission in either rotational direction in the locking mode.

In an example embodiment, wedge plate 108 is tensioned radially inward to resist radially outward displacement. For free-wheel mode, activation hub 110 is displaced in axial direction AD2 causing inner hub 104 to rotate in rotational direction RD1. In an example embodiment, inner circumferential surface 112 of outer race 102 is free of contact with outer circumferential surface 114 of wedge plate 108 in free-wheel mode, enabling clutch 100 to operate with zero drag in free-wheel mode In an example embodiment, wedge plate 108 includes locking segments 116 and resilient segments 118. Each circumferentially resilient segment 118 is connected to and circumferentially disposed between a respective pair of locking segments 116. In an example embodiment, inner hub 104 and 106 are arranged to urge wedge plate 108 radially outward to transition from the free-wheel mode to the locking mode. The outward displacement of plate 108 increases respective circumferential distances between the respective pairs of locking segments 116 and causes outer circumference 114 of wedge plate 108 to displace radially outward to contact inner circumferential surface 112 of outer race 102. When activation hub 110 is sufficiently displaced in axial direction AD1, clutch 100 is in locking mode and wedge plate 108 and hubs 104 and 106 are non-rotatably connected to outer race 102.

In an example embodiment, inner hubs 104 and 106 include radially outwardly extending ramps 104A and 106A, respectively. Activation hub 110 is axially displaceable such that ramps 104A rotate in rotational direction RD1 for the free-wheel mode, and ramps 104A rotate in rotational direction RD2 to contact wedge plate 108 to non-rotatably connect inner hubs 104 and 106 with outer race 102 in the locking mode. Inner hub 104 includes radially disposed side 126 facing axial direction AD2. Inner hub 106 includes radially disposed side 128 facing axial direction AD1. In an example embodiment, ramps 104A and 106A axially extend from sides 126 and 128, respectively. Ramps 104A and 106A include surfaces 130 and 132, respectively.

In an example embodiment, inner hub 104 includes slots 138 which circumferentially bend, or shift, in the axial direction. That is, as slot 138 progresses in the axial direction, for example, axial direction AD1, the circumferential position of the slot shifts in circumferential direction CM2. Inner hub 106 includes axially aligned slots 140. As further described below, slots 138 are used to rotate inner hub 104.

In an example embodiment, activation hub 110 includes protrusions 150, which circumferentially bend, or shift, in the axial direction, and protrusions 152. Protrusions 150 and 152 are engaged with slots 138 and 140, respectively. For free-wheel mode, activation hub 110 displaces in direction AD2, such that the displacement of protrusions 150 through slots 138, rotates hub 104 in direction RD1 such that outer race 102 is rotatable with respect to inner hubs 104 and 106. For locking mode, activation hub 110 axially displaces in direction AD1, opposite axial direction AD2, such that the displacement of protrusions 150 through slots 138 rotates hub 104 in direction RD2 to non-rotatably connect wedge plate 108 with outer race 102 and inner hubs 104 and 106.

In an example embodiment, each segment 116 includes portion 142 and 144 forming inner circumferential surface 120 of the segment. Portions 142 and 144 taper radially inward in rotational directions RD2 and RD1, respectively. Ramps 104A and 106A, in particular, surfaces 130 and 132, respectively, contact portions 142 and 144. For example, to initiate locking mode while hubs 104 and 106 are rotating in direction RD2 relative to the outer race, hub 104 rotates in direction RD2, and ramps 104A begin to slide along portions 142 in direction RD2, forcing plate 108 radially outward to non-rotatably connect to race 102. For example, to initiate locking mode while hubs 104 and 106 are rotating in direction RD1 relative to the outer race, hub 104 rotates in direction RD2, and ramps 104A contact portions 142 and rotate the wedge plate in direction RD2 such that portions 144 contact and slide along ramps 106A, forcing plate 108 radially outward to non-rotatably connect to race 102.

Figure 6:
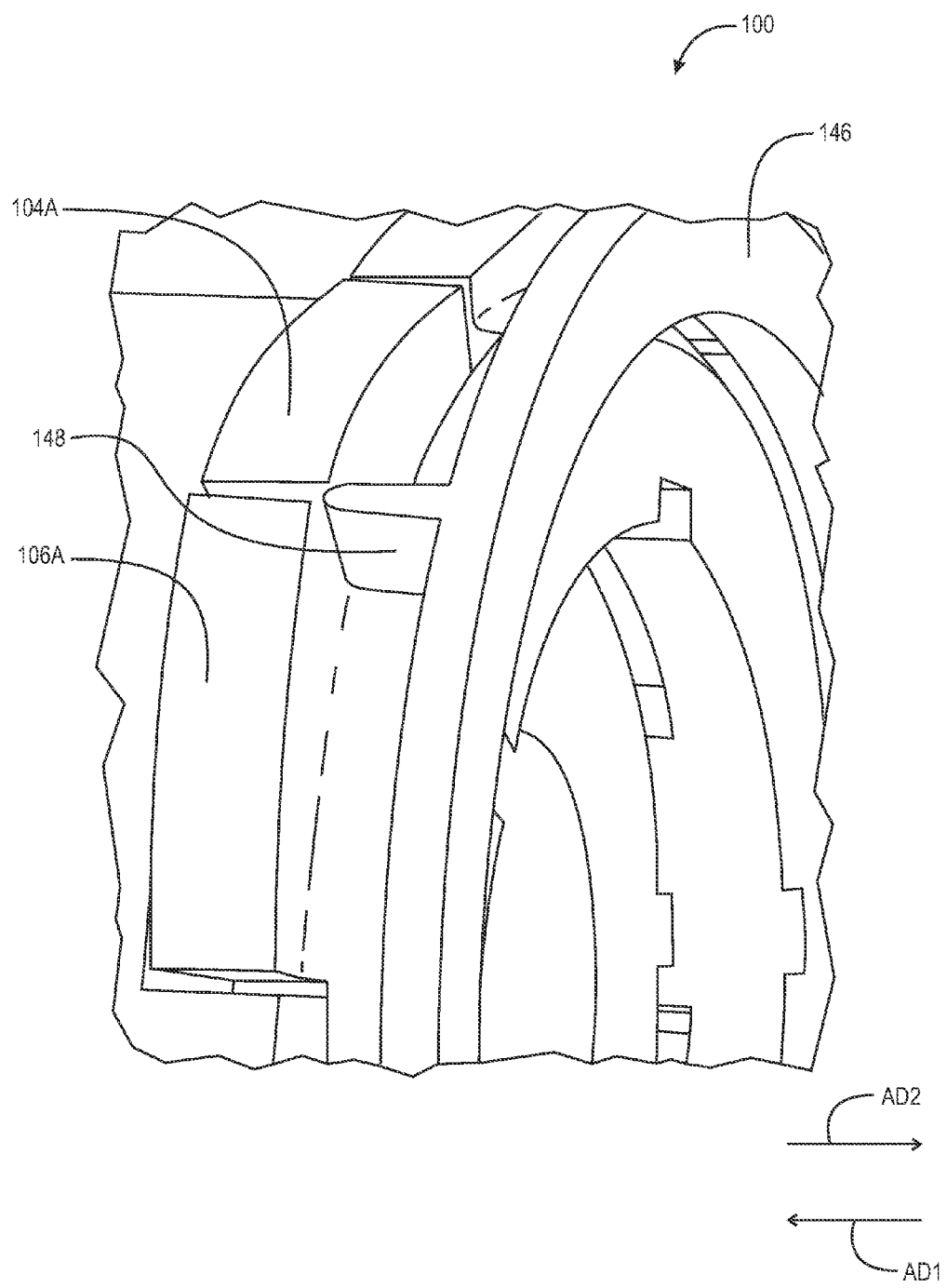
FIG. 6 is a partial cross-sectional view of the bi-directional clutch of FIG. 2 with a locking ring.

FIG. 6 is a partial cross-sectional view of bi-directional clutch 100 of FIG. 2 with locking ring 146. The following should be viewed in light of FIGS. 2 through 6. In an example embodiment, clutch 100 includes axially displaceable locking ring 146 to engage inner hubs 104 and 106 to rotationally lock inner hubs 104 and 106 in the locking mode. In an example embodiment, locking ring 146 includes axial wedges 148 protruding in axial direction AD1. Actuator 154 displaces locking ring 146 in axial direction AD1 to insert axial wedges 148 between ramps 104A and 106A of inner hubs 104 and 106, respectively, to rotationally lock the inner hubs. When locking ring 146 is fully engaged, hubs 104 and 106 are rotationally locked. When locking ring 146 is fully engaged with inner hubs 104 and 106, clutch 100 is in a locked position and clutch 100 operates with zero lash.

To return to free-wheel mode, actuator 154 is displaced in direction AD2 to disengage locking ring 146 from hubs 104 and 106. Once the locking ring is disengaged, inner hub 106 rotates, for example, in direction RD2 as activation hub 110 is axially displaced in direction AD2. This enables wedge plate 108 to retract radially inward, thereby removing contact with outer race 102. Once wedge plate 108 breaks contact with outer race 102, clutch 100 is in free-wheel mode.

In an example embodiment, activation hub 110 is axially locked with actuator 111 in the locking mode after activation hub 110 is displaced a sufficient distance in direction AD1. This keeps the clutch locked with zero lash.

In an example embodiment, when activation hub 110 is fully displaced in axial direction AD1 by actuator 111, that is, clutch 100 is in the locking mode, actuator 111 is displaced in axial direction AD2 such that inner hubs 104 and 106 rotate relative to each other until radially disposed sides 156 and 158 of ramps 104A and 106A, respectively, contact each other. In this configuration, clutch 100 is in locking mode for one of directions RD1 or RD2 until torque is removed, after which clutch 100 free-wheels.

In an example embodiment, inner circumferential surface 112 of outer race 102 and outer circumferential surface 114 of wedge plate 108 have respective chamfered edges. The use of chamfered edges on surfaces 112 and 114 provides a smooth transition between free-wheel mode and locking mode. In addition, chamfered edges provide greater surface area when outer circumferential surface 114 of wedge plate 108 contacts inner circumferential surface 112 of outer race 102.

In an example embodiment, clutch 100 is used to provide torque to an accessory drive system. For instance, in locking mode, clutch 100 transfers torque to a planetary gear that helps start an engine. If clutch 100 is disengaged, in free-wheel mode, the planetary gear is not in use.

Figure 7:
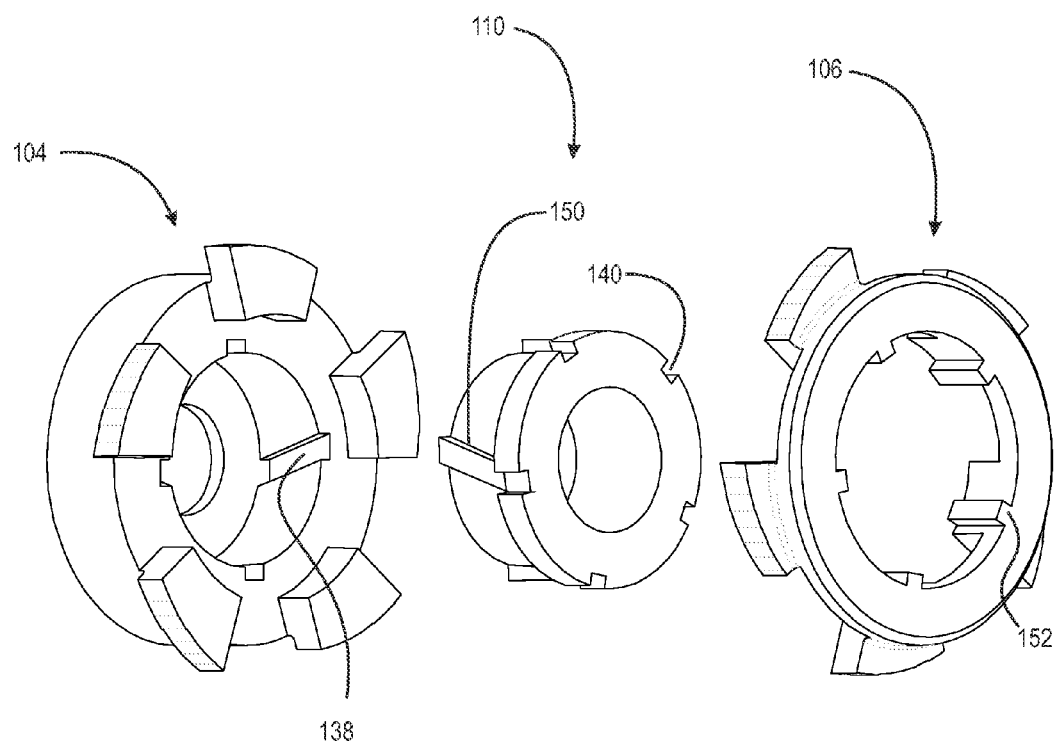
FIG. 7 is an exploded view showing an activation hub with slots and protrusions and inner hubs with respective slots and protrusions; and, FIG. 8 is a partial front view of a one-way clutch with a split inner hub.

FIG. 7 is an exploded view of an activation hub with slots and inner hubs with protrusions. In an example embodiment, inner hub 104 includes slots 138, inner hub 106 includes protrusions 152 and activation hub 110 includes protrusions 150 and slots 140. The discussion of clutch 100 for FIGS. 2 through 6 is applicable to the embodiment of clutch 100 shown in FIG. 7. It should be understood that other combinations (not shown) are possible, such as: inner hub 104 having protrusions 150, hub 110 having protrusions 152 and slots 138, and inner hub 106 having slots 140; and inner hub 104 having protrusions 150, hub 110 having slots 138 and 140, and inner hub 106 having protrusions 152. The discussion of clutch 100 for FIGS. 2 through 6 is applicable to the preceding embodiments of clutch 100.

Figure 8:
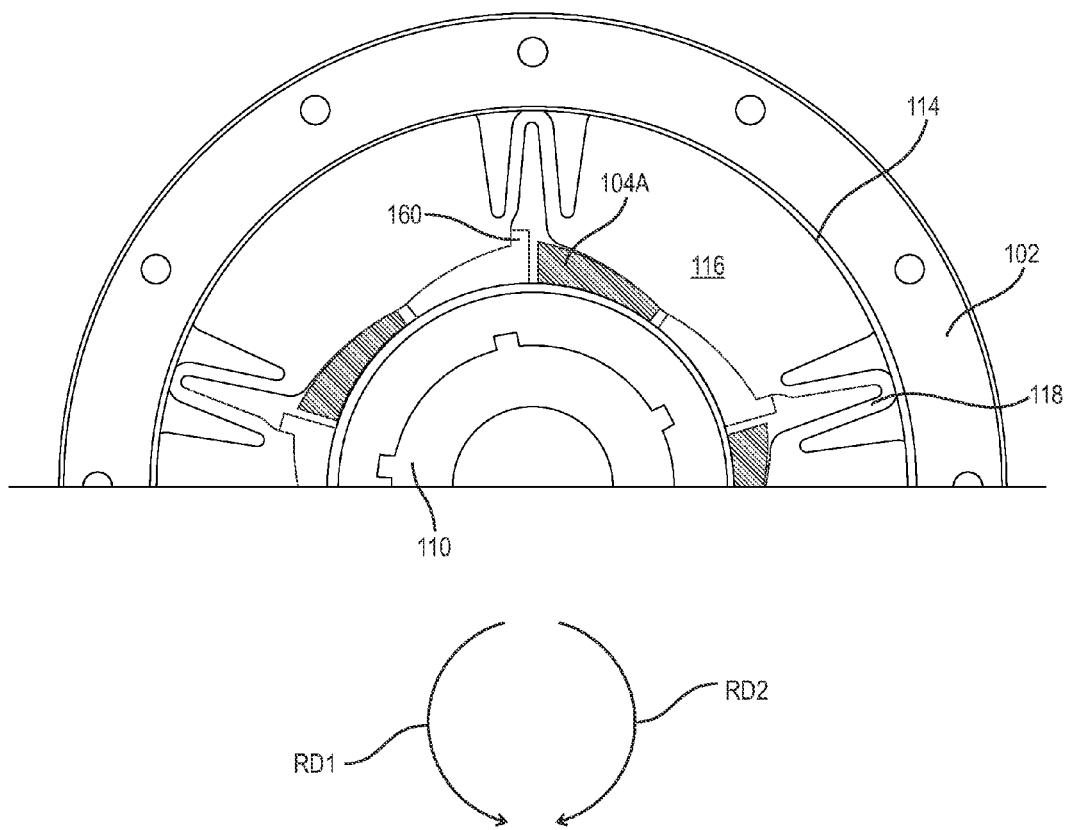

FIG. 8 is a partial front view of one-way clutch 100 with a split inner hub. In an example embodiment, clutch 100 is a one-way, rather than a bi-directional clutch. In a one-way clutch embodiment, one of ramps 104A or 106A is replaced by blocking elements 160. In FIG. 8, ramps 106A are replaced by elements 160; however, it should be understood that ramps 104A can be replaced by elements 160. One-way clutch 100 operates as follows. For the locking mode (relative rotation of the inner hubs with respect to the outer race in direction RD2), hub 104 is displaced in direction RD2, ramps 104A engage the wedge plate, and the wedge plate begins to rotate with the outer race causing the ramps to ride up portions 142 to displace the wedge plate radially outward to non-rotatably connect the outer race with the inner hubs. For the free-wheel mode (relative rotation of the inner hubs with respect to the outer race in direction RD1), blocking elements 160 rotate wedge plate 116 in direction RD1 without causing the wedge plate to expand radially outward or causing portions 142 to ride up ramps 104A.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What I claim is:

1. A bi-directional wedge clutch, comprising:
an outer race;
first and second inner hubs;
a wedge plate, radially located between the outer race and the first and second inner hubs; and,
an axially displaceable activation hub engaged with the first and second inner hubs and arranged to:
for a free-wheel mode, rotate at least one of the first or second inner hubs in a first rotational direction, with respect to the other of the first or second inner hubs, such that the wedge plate is free of contact with the outer race; and,
for a locking mode, rotate the at least one of the first or second inner hubs in a second rotational direction, opposite the first rotational direction, with respect to the other of the first or second inner hubs, to non-rotatably connect the wedge plate with the outer race and the first and second inner hubs.

2. The bi-directional wedge clutch of claim 1, wherein the axially displaceable activation hub is arranged to:
for the free-wheel mode, rotate the first and second inner hubs in the first and second rotational directions, respectively, such that the wedge plate is free of contact with the outer race and the first and second inner hubs in the free-wheel mode; and,
for the locking mode, rotate the first and second inner hubs in the second and first rotational directions, respectively, to non-rotatably connect the wedge plate with the outer race and the first and second inner hubs.

3. The bi-directional wedge clutch of claim 2, wherein:
the first and second inner hubs include first and second pluralities of radially extending ramps, respectively;
the wedge plate includes a plurality of locking segments;
each locking segment includes respective first and second segments forming an inner circumference of said each locking segment;
each respective first segment tapers radially inward in the first rotational direction;
each respective second segments tapers radially inward in the second rotational direction; and,
the activation hub is axially displaceable such that, for the locking mode, the respective first and second pluralities of ramps rotate in the second and first rotational directions, respectively, to contact the respective first and second segments.

4. The bi-directional wedge clutch of claim 1, wherein the wedge plate is tensioned radially inward to resist radially outward displacement such that the wedge plate is free of contact with the outer race and the first and second inner hubs in the free-wheel mode.

5. The bi-directional wedge clutch of claim 1, wherein:
the wedge plate includes:
a plurality of locking segments; and,
a plurality of circumferentially resilient segments; and,
each circumferentially resilient segment is connected to and circumferentially disposed between a respective pair of locking segments.

6. The bi-directional wedge clutch of claim 5, wherein:
in a transition from the free-wheel mode to the locking mode, the at least one of the first or second inner hubs is arranged to urge the wedge plate radially outward such that:
respective circumferential distances between the respective pairs of locking segments increase; and,
an outer circumference for the wedge plate displaces radially outward to contact the outer race.

7. The bi-directional wedge clutch of claim 1, wherein:
the at least one of the first or second inner hubs includes a first plurality of radially extending ramps;
the wedge plate includes a plurality of locking segments;
each locking segment includes a respective first segment forming a respective portion of an inner circumference of said each locking segment;
each respective first segment tapers radially inward in the first rotational direction; and,
the activation hub is axially displaceable such that, for the locking mode, the first plurality of ramps rotates in the second rotational direction to contact the first segments.

8. The bi-directional wedge clutch of claim 1, further comprising:
a locking ring axially displaceable to engage the first and second inner hubs to rotationally lock the first and second inner hubs in the locking mode.

9. The bi-directional wedge clutch of claim 1, wherein an inner circumferential surface of the outer race and an outer circumferential surface of the wedge plate have respective chamfered edges.

10. The bi-directional wedge clutch of claim 1, further comprising:
an actuator arranged to axially fix the activation hub to hold the first and second inner hubs in the locking mode.

11. A bi-directional wedge clutch, comprising:
an outer race;
first and second inner hubs;
a wedge plate, radially located between the outer race and the first and second inner hubs; and,
an activation hub, wherein:
the first inner hub includes a first plurality of slots or a first plurality of protrusions;
the second inner hub includes a second plurality of slots or a second plurality of protrusions;
the activation hub includes: third and fourth pluralities of slots; third and fourth pluralities of protrusions; or a third plurality of slots and a third plurality of protrusions;
respective slots or protrusions for the first and second inner hubs are engaged with respective slots or protrusions for the activation hub; and,
the activation hub is arranged to:
for a free-wheel mode, rotate at least one of the first or second inner hubs in a first rotational direction, with respect to the other of the first or second inner hubs, such that the outer race is rotatable with respect to the first and second inner hubs in the first rotational direction and in a second rotational direction, opposite the first rotational direction; and,
for a locking mode, rotate the at least one of the first or second inner hubs in the second rotational direction, with respect to the other of the first or second inner hubs, to non-rotatably connect the wedge plate with the outer race and the first and second inner hubs for rotation of the outer race, with respect to the first and second inner hubs, in the first and second rotational directions.

12. The bi-directional wedge clutch of claim 11, wherein:
the first and second inner hubs include first and second pluralities of radially extending ramps, respectively;
the wedge plate includes a plurality of locking segments;
each locking segment includes respective first and second segments forming an inner circumference of said each locking segment;
each respective first segment tapers radially inward in the first rotational direction;
each respective second segments tapers radially inward in the second rotational direction; and,
the activation hub is axially displaceable such that, for the locking mode, the respective first plurality of ramps rotates in the second rotational direction to contact the respective first segments.

13. The bi-directional wedge clutch of claim 11, further comprising:
a locking ring axially displaceable to engage the first and second inner hubs to rotationally lock the first and second inner hubs in the locking mode.

14. The bi-directional wedge clutch of claim 11, wherein an inner circumferential surface of the outer race and an outer circumferential surface of the wedge plate have respective chamfered edges.

15. A bi-directional wedge clutch, comprising:
an outer race;
a first inner hub including a first plurality of radially extending ramps;
a second inner hub including a second plurality of radially extending ramps;
a wedge plate, radially located between the outer race and the first and second inner hubs; and,
an activation hub including first and second pluralities of protrusions, wherein:
one of the first or second inner hubs includes a first plurality of slots circumferentially bending in a first or second axial direction and engaged with the first plurality of protrusions;
the other of the first or second inner hubs includes a second plurality of axially aligned slots engaged with the second plurality of protrusions; and,
the activation hub is arranged to:
for a free-wheel mode, rotate the one of the first or second inner hubs in a first rotational direction, with respect to the other of the first or second inner hubs, such that the wedge plate is free of contact with the outer race; and,
for a locking mode, rotate the one of the first or second inner hubs in a second rotational direction, opposite the first rotational direction, with respect to the other of the first or second inner hubs, to non-rotatably connect the wedge plate with the outer race and the first and second inner hubs.

16. The bi-directional wedge clutch of claim 15, wherein:
the wedge plate includes a plurality of locking segments;
each locking segment includes respective first and second segments forming an inner circumference of said each locking segment;
each respective first segment tapers radially inward in the first rotational direction;
each respective second segments tapers radially inward in the second rotational direction; and,
in the locking mode, the respective first segments are in contact with the first plurality of ramps and the respective second segments are in contact with the second plurality of ramps.

17. The bi-directional wedge clutch of claim 15, wherein the wedge plate is tensioned radially inward to resist radially outward displacement such that the wedge plate is free of contact with the outer race in the free-wheel mode.

18. The bi-directional wedge clutch of claim 15, further comprising:
a locking ring axially displaceable to engage the first and second inner hubs to rotationally lock the first and second inner hubs in the locking mode.

19. The bi-directional wedge clutch of claim 15, further comprising:
an actuator arranged to provide a force urging the activation hub in the second axial direction, wherein when the activation hub is in the locking mode, the actuator is arranged withdraw the force such that:
the second inner hub rotates relative to the first inner hub until radially disposed sides of the second plurality of radially extending ramps contact radially disposed sides of the first plurality of radially extending ramps; and,
the wedge plate remains in non-rotatable contact with the outer race and the first and second inner hubs for relative rotation of the activation hub and the outer race in a first rotational direction.

20. A one-way wedge clutch, comprising:
an outer race;
a first inner hub including a plurality of radially outwardly extending ramps;
a second inner hub including a plurality of radially outwardly extending protrusions;
a wedge plate, radially located between the outer race and the first and second inner hubs and including a plurality of radially inwardly extending ramps; and,
an axially displaceable activation hub engaged with the first and second inner hubs and arranged to rotate the first inner hub in a first rotational direction with respect to the second inner hub such that:
for rotation of the first and second inner hubs with respect to the outer race in the first rotational direction, the pluralities of radially inwardly and outwardly extending ramps engage and displace the wedge plate radially outward to non-rotationally connect the outer race and the first and second inner hubs; and,
for rotation of the first and second inner hubs with respect to the outer race in a second rotational direction, opposite the first rotational direction, the plurality of radially outwardly extending protrusions engage and rotate the wedge plate such that the outer race is rotatable with respect to the first and second inner hubs.

* * * * *